(12) United States Patent
Tanimura

(10) Patent No.: US 6,371,380 B1
(45) Date of Patent: Apr. 16, 2002

(54) NON-CONTACTING-TYPE INFORMATION STORING DEVICE

(75) Inventor: Kazunari Tanimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/410,281

(22) Filed: Sep. 30, 1999

(30) Foreign Application Priority Data

Oct. 2, 1998 (JP) ............................................. 10-281305

(51) Int. Cl.[7] ............................................... G06K 19/06
(52) U.S. Cl. ....................................... 235/497; 235/487
(58) Field of Search ................................. 235/492, 441, 235/486, 488, 493, 487, 449, 450, 451

(56) References Cited

U.S. PATENT DOCUMENTS

| | | | | |
|---|---|---|---|---|
| 5,497,140 A | * | 3/1996 | Tuttle et al. | 342/51 |
| 5,808,285 A | * | 9/1998 | Rockstein et al. | 235/472 |
| 6,045,652 A | * | 4/2000 | Tuttle et al. | 156/292 |
| 6,068,192 A | * | 5/2000 | McCable | 235/487 |
| 6,073,856 A | * | 6/2000 | Takahashi | 235/492 |
| 6,078,791 A | * | 6/2000 | Tuttle et al. | 455/90 |

FOREIGN PATENT DOCUMENTS

JP 61-94084 * 5/1986

* cited by examiner

Primary Examiner—Karl D. Frech
(74) Attorney, Agent, or Firm—Frommer Lawrence & Haug LL; William S. Frommer; Matthew K. Ryan

(57) ABSTRACT

A non-contacting-type information storing device is stuck to the adherent surface of the object, and includes a storing means for storing the stated information and an antenna which has the stated loop form and which is connected to the storing means. The non-contacting-type information storing device further includes a magnetism absorbing plate which is made from high-permeable material and which is placed so that it is interposed between the adherent surface of the object and the antenna at the time when the information storing device is stuck to the adherent surface of the object. As a result, it is possible to provide a non-contacting-type information storing device in which the modulated magnetic-field given from the exterior can be absorbed by the antenna without being leaked to the adherent surface of the object even though the adherent surface of the object is made of metal. Thus the information can be read irrespective of the type of the material of the adherent surface of the object.

4 Claims, 7 Drawing Sheets

NON-CONTACTING-TYPE INFORMATION STORING DEVICE

BACKGROUND OF THE INVENTION

1. Field of the Invention

This invention relates to a non-contacting-type information storing device, and more particularly, is suitably applied to a non-contacting-type commodity-identifying tag which is used in the process of distribution, stock control and such.

2. Description of the Related Art

A label printed a bar code indicating the stated identification data of a commodity (hereinafter, this is referred to as a bar-code label) has been used as a non-contacting type commodity-identifying tag of this kind; by reading the identification data written in the bar code, when necessary in the process of distribution, stock control and such, the commodity to which this bar-code label has been stuck can easily be identified.

In such a commodity identifying method that uses a bar-code label, because of very small storage capacity, 32 byte in general, of a bar code, the amount of information that can be allocated to one commodity is limited to, for instance, the identification (ID) number, manufacture data and such of the commodity. As a result, the applicability is limited to only simple systems of the process of distribution, stock control and such.

Therefore, recently, in complex systems of distribution process, stock control and such, a non-contacting-type tag that includes a memory integrated circuit (IC) is used as a, commodity-identifying tag (hereinafter, this is referred to as a memory-IC tag).

In comparison with a bar code label, a memory-IC tag has such higher storage capacity: 1k byte, that it is able to greatly increase the amount of information that can be allocated to one commodity; as a result, there is such an advantage that it is also applicable enough to complex systems of distribution process, stock control and such.

In addition, the data contents of a memory-IC tag can be rewritten any number of times; therefore, the memory-IC tag can be recycled efficiently: the memory-IC tag is peeled away from the commodity at the time of transportation or the time of sale, and then the identification data of the different commodity is newly written in it.

Practically, in the process of distribution, stock control and such, a data read/write system 1 shown in FIG. 1 is constructed so that the stated identification data is read from a memory-IC tag 3 stuck to a commodity 2, or new identification data is written in the memory-IC tag 3.

As the-memory-IC tag 3 that can be applied to such a data read/write system 1, there is one known wherein a memory IC 4 is built almost in the center of a substrate (hereinafter, this is referred to as a tag substrate) 3A that has a multi-layer structure for instance, and a wiring (hereinafter, this is referred to as a tag antenna) 5 is placed along the marginal inner side of the tag substrate 3A so that it forms a loop of an approximately square shape.

As shown in FIG. 2, the memory-IC tag 3 has an antenna board 3AA provided with a memory IC 4 almost in the center of its underside surface, and the tag antenna 5 extended from the memory IC 4 has been attached to the marginal inside portion of the surface.

To the under surface of this antenna board 3AA, a reinforcing plate 3AB made of polyethylene telephthalate (PET) is stuck, so as to protect the memory IC 4 and the tag antenna 5. This reinforcing plate 3AB has a thickness that is more than or equal to the height of the memory IC 4, and a penetrating hole 3ABH whose size is slightly larger than that of the memory IC is formed almost in the center of the reinforcing plate 3AB.

When the reinforcing plate 3AB has been stuck to the antenna substrate 3AA, the memory IC 4 is contained in the penetrating hole 3ABH of the reinforcing plate 3AB, and so the memory IC 4 is able to avoid jutting from the reinforcing plate 3AB.

One surface of a pressure-sensitive adhesive film 3AC is glued to the reinforcing plate 3AB; to the other surface of the pressure-sensitive adhesive film 3AC, a releasable paper 3AD is stuck in a manner that it can be peeled away as necessary. On the other hand, one surface of a pressure-sensitive adhesive film 3AE is glued to the top surface of the antenna substrate 3AA; to the other surface of the pressure-sensitive adhesive film 3AE, a cover paper 3AF is stuck.

Thus, the operator can write the characters, the signs and such regarding a commodity 2 on the cover paper 3AF that lies on one side of the tag cover 3A, and able to stick the memory-IC tag 3 on the surface of the commodity 2, by pressing the pressure-sensitive adhesive film 3AC onto the surface of the commodity 2 with the releasable paper 3AD peeled away from the other side of the tag substrate 3A.

A data read/write device 6 of the data read/write system 1 (FIG. 1) includes a read/write antenna division 7 for causing electromagnetic induction between itself and the memory-IC tag 3, and a read/write module 8 for sending and receiving various data via the read/write antenna division 7.

In the read/write antenna division 7, a loop coil of approximately square shape (hereinafter, this is referred to as a read/write antenna) 9 is formed on one side of a read/write antenna substrate 7A that is made from, for instance, glass epoxy resin material, so that its position corresponds to the position of the tag antenna 5 formed in the memory-IC tag 3, when it is opposed to the memory-IC tag 3.

One end and the other end of this read/write antenna 9 are connected to the read/write module 8 via a connector 10 and a harness 11 in succession. In a state that the read/write antenna division 7 is opposed to the memory-IC tag 3, the read/write module 8 feeds a current to the read/write antenna 9 from the stated AC power supply, via the harness 11 and the connector 10 in succession.

As a result, a magnetic field modulated in response to the change of the given current is generated around the read/write antenna 9, so that an induction voltage is generated in the tag antenna 5 that is formed in the memory-IC tag 3 in response to the modulated magnetic-field. The degree of coupling of electromagnetic induction concerning the read/write antenna 9 and the tag antenna 5 of this time varies in response to the mutual relationship of position.

The memory IC 4 rectifies the induction voltage inputted through the tag antenna 5, and then performs reading or writing of the identification data on the basis of the AC components that appear in the obtained voltage.

After rectification of the induction voltage inputted via the tag antenna 5, the memory IC 4 is able to obtain power-supply voltage on the basis of the DC components that appear in the obtained voltage, and so able to start up in response to the power-supply voltage even though a power source such as a battery is not provided in the memory-IC tag 3.

When the identification data is read, in the memory-IC tag 3, by mutual induction, a modulated magnetic-field is generated from the tag antenna 5 to the read/write antenna 9, such that it cancels the modulated magnetic-field generated from the read/write antenna 9 to the tag antenna 5.

At this time, because the input impedance between the both terminals of the tag antenna 5 varies in response to the identification data that has been read from the memory IC 4, the varied amount is added to the modulated magnetic-field that generate from the tag antenna 5 to the read/write antenna 9.

Hence, the impedance between the both terminals of the read/write antenna 9 which is opposed to the tag antenna 5 varies in like manner, and so the induction voltage generated in the read/write antenna 9 also varies to the same extent. Therefore, by demodulating the generated varied amount of the induction voltage, the read/write module 8 is able to read the identification data obtained from the memory IC 4.

However, when such a memory-IC tag 3 is stuck on the adherent surface 2 A made of metal of a commodity 2 and then the identification data is read from the memory-IC tag 3 by the use of said data read/write device 6, the modulated magnetic-field MF generated from the read/write antenna 9 is absorbed by the adherent surface 2 A of the commodity 2 without reaching the tag antenna 5. On the other hand, part of the modulated magnetic-field MF that has passed through the tag board 3 A is reflected by the adherent surface 2 A so that it might cancel the magnetic field, as shown in FIG. 3. As a result, there has been a fear that the sufficient electric power can not be supplied to the memory IC 4 in the memory-IC tag 3.

As a result, there has been a problem that the identification data can not be read from the memory IC 4 included in the memory-IC tag 3. In the case where the adherent surface 2A of the commodity 2 is made of metal, the memory-IC tag 3 can not be applied.

SUMMARY OF THE INVENTION

In view of the foregoing, an object of this invention is to provide a non-contacting-type information storing device that is able to read information irrespective of the type of the material of the adherent surface of the object.

The foregoing object and other objects of the invention have been achieved by the provision of a non-contacting-type information storing device which is stuck to the adherent surface of an object, having an information storing means storing therein prescribed information on the object and an antenna in a loop form connected to the information storing means, and reads out and writes the prescribed information in the information storing means via the antenna in response to a modulated magnetic-field given from the exterior. The non-contacting-type information storing device comprises: a substrate having the information storing means and the antenna; a magnetism absorbing member made from high-permeable material, provided between the substrate and an adherent surface of the object, and having an area at least enough to cover the antenna provided on the substrate; an adhesive member gluing the substrate and the magnetism absorbing member; and a gluing member gluing the magnetism absorbing member on the adherent surface of the object.

Also, in the non-contacting-type information storing device according to the present invention, the substrate and the magnetism absorbing member are integrated by the adhesive member, and the gluing member is provided on the magnetism absorbing member integrated with the substrate.

Further, in the non-contacting-type information storing device according to the present invention, the adhesive member is provided on the substrate, the gluing material is provided on the magnetism absorbing member, the substrate provided with the adhesive member and the magnetism absorbing member provided with the gluing member are composed as individual units, and the substrate provided with the adhesive member and the magnetism absorbing member provided with the gluing member are integrated when being glued on the adherent surface of the object.

In addition, in the present invention, the magnetism absorbing member is made from high-permeable material whose permeability is 10 or more.

As described above, the present invention provides a magnetism absorbing plate which is made of high-permeable member and which has been placed so that it is interposed between the adherent surface of the object and the antenna at the time when the information storing device is stuck to the adherent surface of the object. As a result, it is possible to provide a non-contacting-type information storing device that the modulated magnetic-field given from the exterior can be absorbed by the antenna without being leaked toward the adherent surface of the object even though the adherent surface of the object is made of metal, Thus, the information can be read irrespective of the type of the material of the adherent surface of the object.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
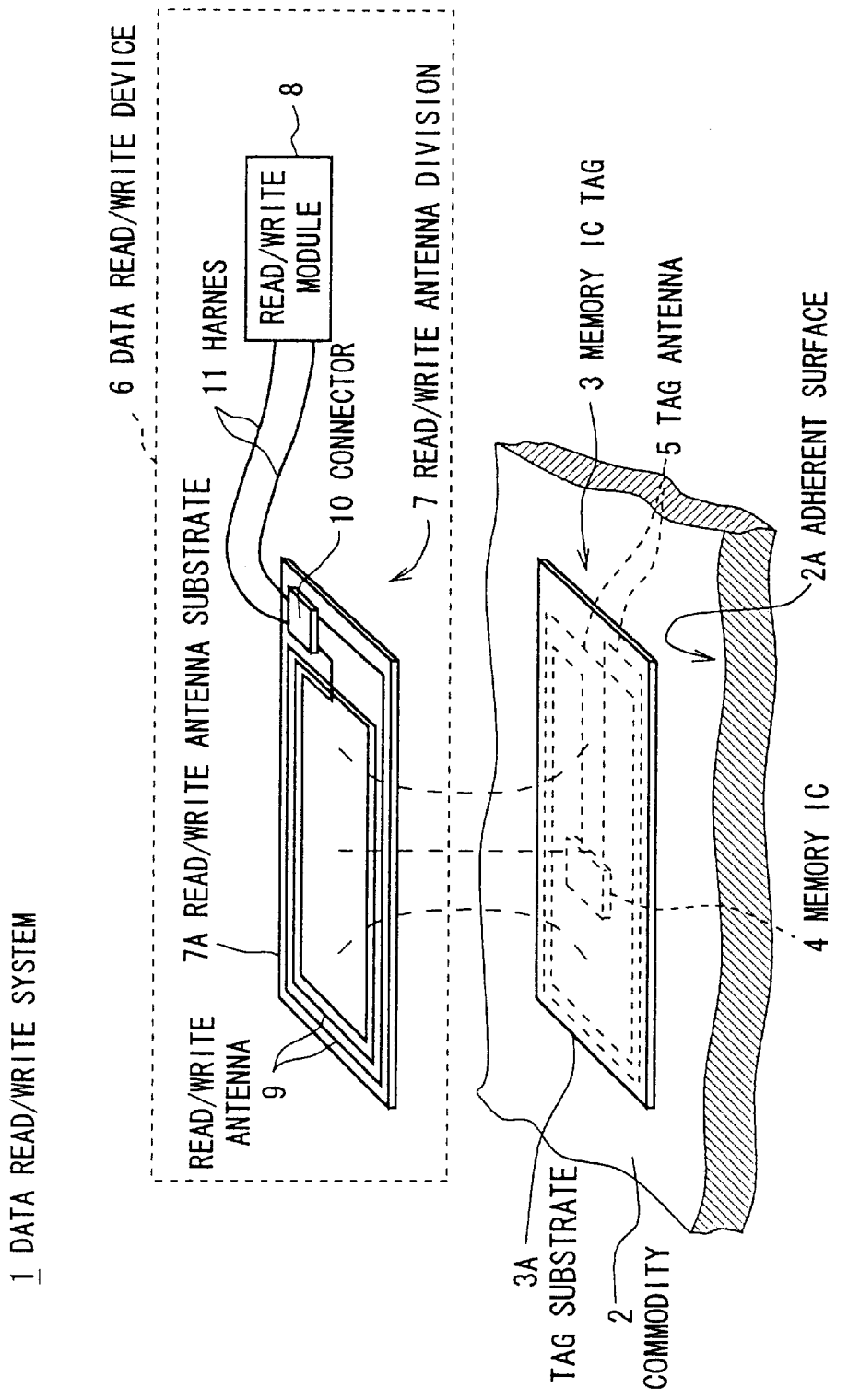
FIG. 1 is a schematic diagram illustrating a configuration of the conventional data read/write system.
Figure 2:
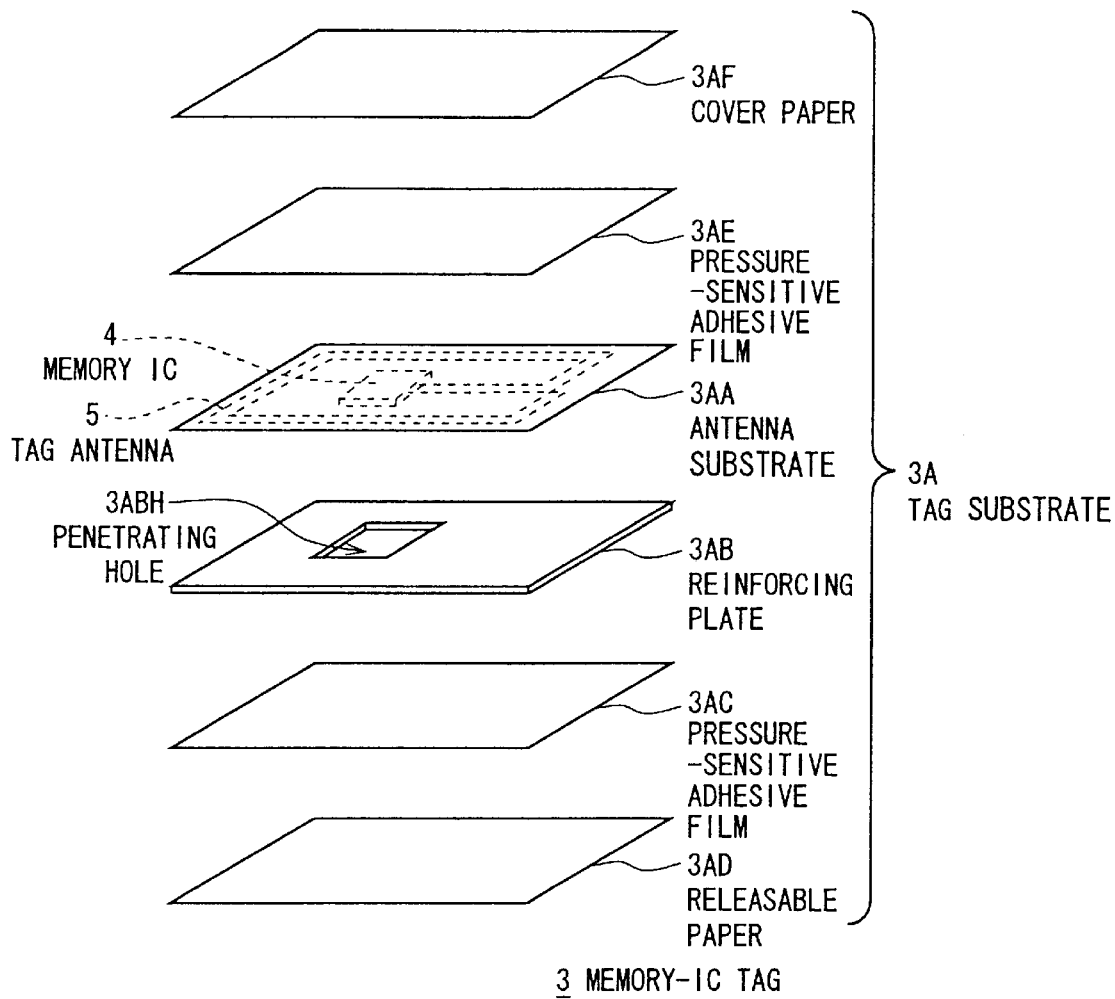
FIG. 2 is a schematic diagram illustrating a configuration of the conventional memory IC tag.
Figure 3:
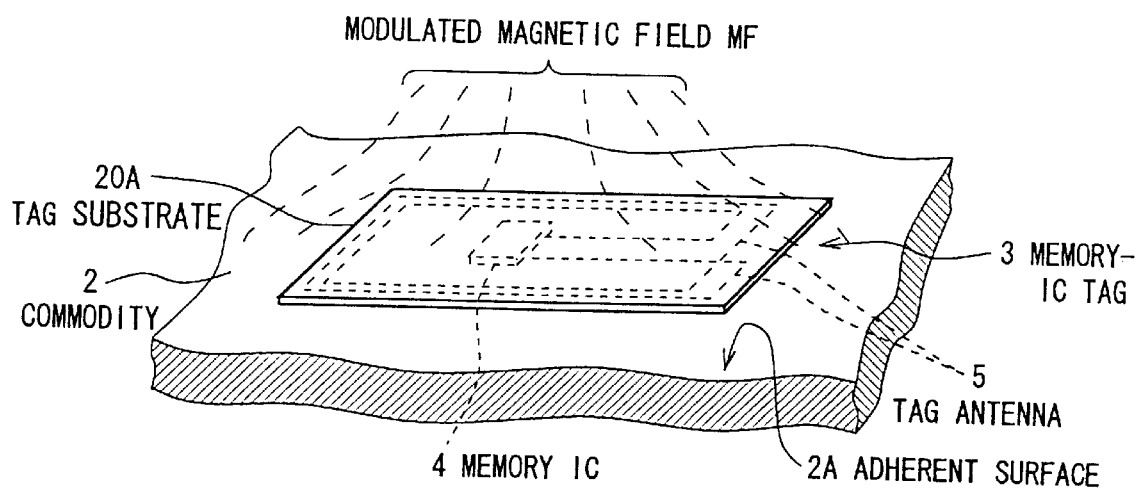
FIG. 3 is a schematic perspective view used for explaining the conventional generation state of the modulated magnetic-field at the time of data reading.
Figure 4:
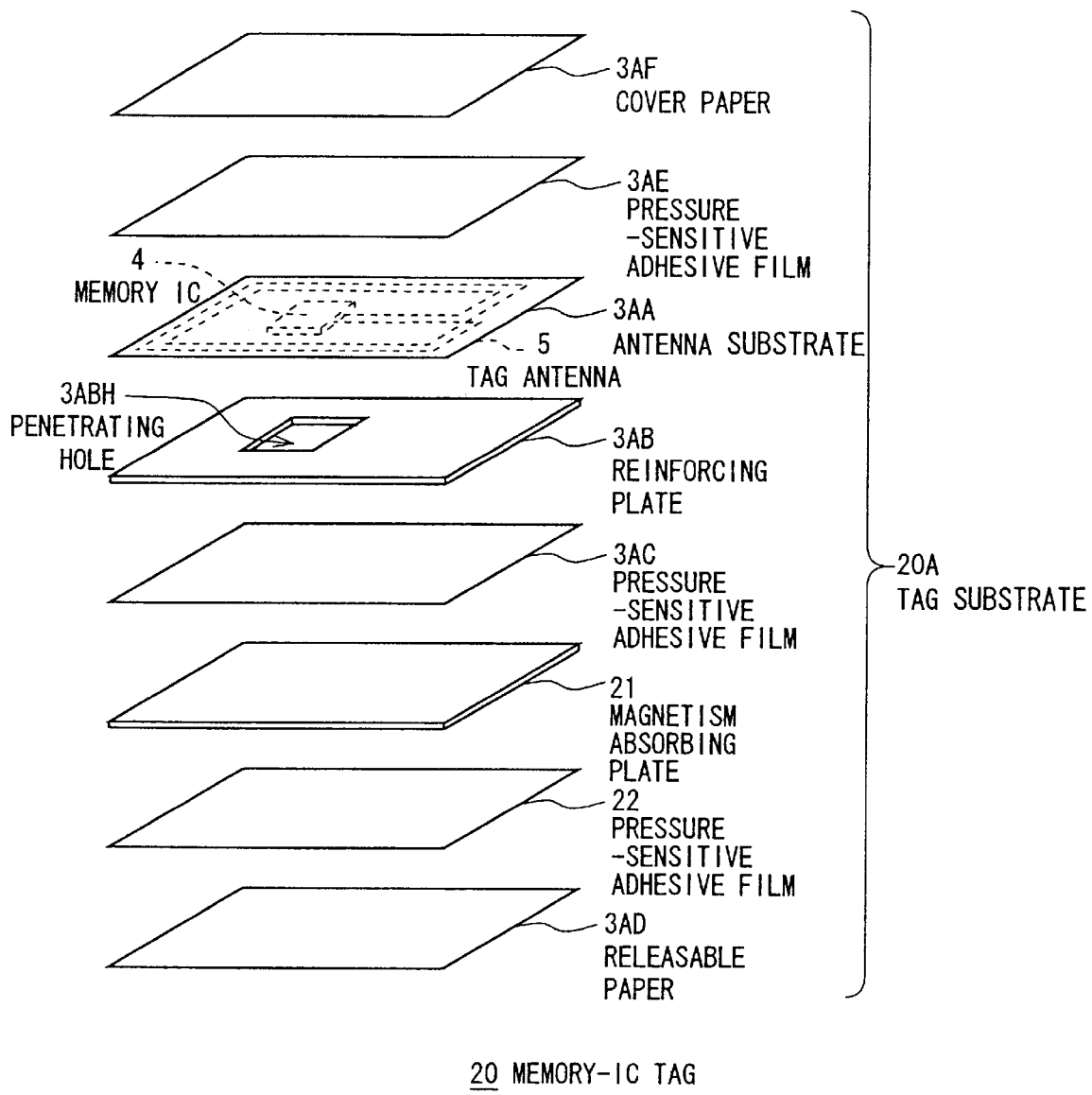
FIG. 4 is a schematic diagram illustrating a configuration of the memory IC tag according to the embodiment.

Preferred embodiments of the present invention will be described with reference to the accompanying drawings:

In FIG. 4, which has the same reference numerals as those of FIG. 2 on its portions corresponding to the portions of FIG. 2, the reference numeral 20 shows, as a whole, a memory-IC tag of the present invention that can be applied to the data read/write system 1 shown in the above-mentioned FIG. 1; the memory-IC tag 20 is constituted by lamination in the same manner as the conventional memory-IC tag 3, excepting that the tag substrate 20A is formed so that one surface of a magnetic absorbing plate 21 made of high-permeable material such as Sendust (permeability is about 26) is stuck on the under surface of the reinforcing plate 3AB via the pressure-sensitive adhesive film 3AC, and the releasable paper 3AD is stuck on the other surface of the magnetism absorbing plate 21 via a pressure-sensitive adhesive film 22 in a manner that it can be peeled away as necessary.

The magnetism absorbing plate 21 made of high-permeable material, has a characteristic that it strongly magnetizes itself even if the magnetic field given from the exterior is extremely weak. Therefore, even though metal material exists in the periphery of the magnetism absorbing plate 21, the magnetism absorbing plate 21 is able to absorb the magnetic field without leaking it out to the metal material.

When the memory-IC tag 20 is used, the characters, the signs and such regarding a commodity 2 are written on the cover paper 3AF that lies on one side of the tag substrate 20A, and then the pressure-sensitive adhesive film 22 is pressed onto the surface of the commodity 2 with the releasable paper 3AD peeled away from the other side of the tag substrate 20A, thus the memory-IC tag 20 can be stuck onto the surface of the commodity 2.

With the above constitution, when the commodity 2 with the memory-IC tag 20 stuck on it is conveyed on the occasion of distribution process, stock control and such, the operator opposes the above-mentioned data read/write device 6 shown in FIG. 1 to the memory-IC tag 20 stuck to the commodity 2.

In response to the operation of the operator, the read/write antenna division 7 then reads the identification data $D_{ID}$ from the memory IC 4, with the above-mentioned magnetic-field modulation system performing mutual induction between the read/write antenna 9 formed on the read/write antenna substrate 7A and the tag antenna 5 formed in the memory-IC tag 20.

Figure 5:
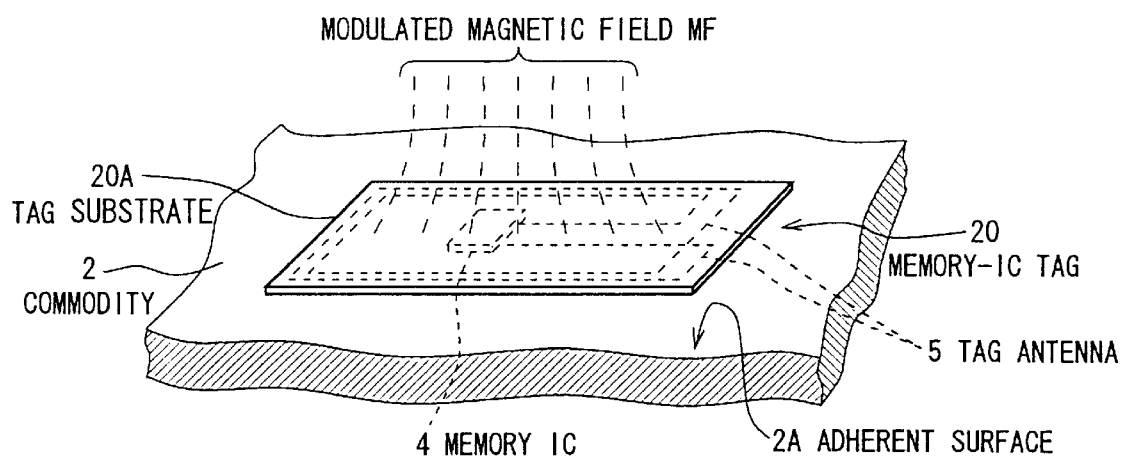
FIG. 5 is a schematic perspective view used for explaining the generation state of the modulated magnetic-field at the time of data reading according to the embodiment.

In the case of this memory-IC tag 20, the magnetism absorbing plate 21 is superimposed under the antenna substrate 3AA on which the tag antenna 5 is formed, therefore, as shown in FIG. 5, the modulated magnetic-field MF generated from the read/write antenna 9 is absorbed by the magnetism absorbing plate 21 after passing through the tag antenna 5 without leaking to the adherent surface 2A of the commodity 2. Hence, the sufficient induction voltage is generated in the tag antenna 5 in response to the. modulated magnetic-field MF, and so the identification data can be read from the memory IC According to the above configuration, the magnetism absorbing plate 21 has been provided in the memory-IC tag 20 so that it is interposed between the adherent surface 2A of the commodity 2 and the tag antenna 5 when the memory-IC tag 20 is stuck to the adherent surface 2A. Thereby, even though the adherent surface 2A of the commodity 2 is made of a metal, the modulated magnetic-field MF generated from the read/write antenna 9 included in the data read/write device 6 can be absorbed by the tag antenna 5 without being leaked to the adherent surface 2A of the commodity 2, and so, by giving the induction voltage generated from the tag antenna 5 in response to the modulated magnetic-field MF to the memory IC 4, the identification data can be read without fail. Thus, it is possible to provide a memory IC tag 20 that can read the identification data irrespective of the type of the material of the adherent surface 2A of the commodity 2.

In the above embodiment, the description has been given of the case where Sendust is used as the magnetism absorbing plate 21 that is interposed between the adherent surface 2A of the commodity (object) 2 and the tag antenna 5. However, the present invention is not limited thereto. Another high-permeable material (that is, soft magnetic material) such as ferrite, carbonyl iron and so on can also be used as the magnetism absorbing plate.

In this case, if a magnetism absorbing plate 21 made from high-permeable material whose permeability is 10 or more is used, the modulated magnetic-field MF generated from the read/write antenna 9 can be absorbed by the tag antenna 5 sufficiently in effect, and so, the induction voltage generated from the tag antenna 5 can be given to the memory IC 4 sufficiently in effect.

Figure 6:
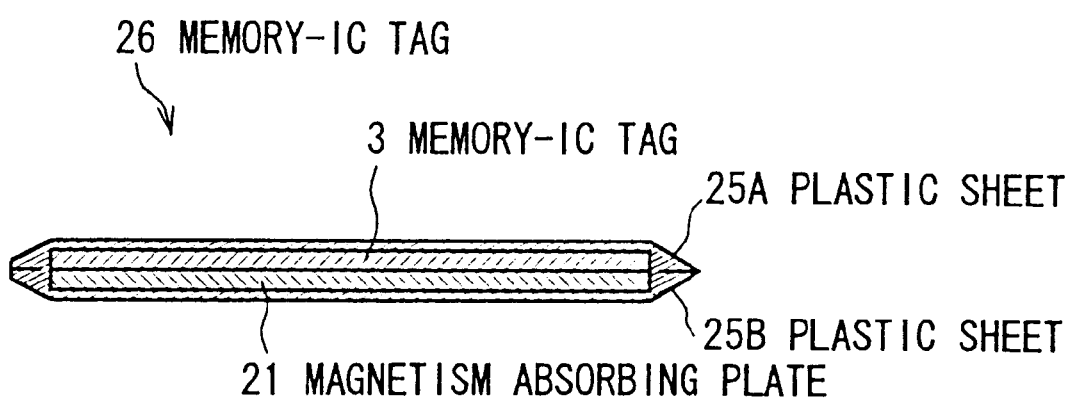
FIG. 6 is a schematic cross-sectional view illustrating one example of an application of the magnetism absorbing plate according to another embodiment.

Besides, in the above embodiment, the description has been given of the case where the memory-IC tag 20 has been constituted by laminating the tag board 20A including the magnetism absorbing plate 21. However, the present invention is not limited thereto. For instance, as shown in FIG. 6, the memory-IC tag 26 can also be constituted by superimposing the memory-IC tag 3 and the magnetism absorbing plate 21, holding them between plastic sheets 25A and 25B, and then heating and sealing them hermetically.

In this way, it is possible to apply the conventional memory-IC tag 3 to a commodity 2 whose adherent surface 2A is made of metal. Therefore, it is possible to effectively use the conventional memory-IC tag 3 irrespective of the type of the material of the adherent surface 2A of the commodity 2 without waste.

Figure 7:
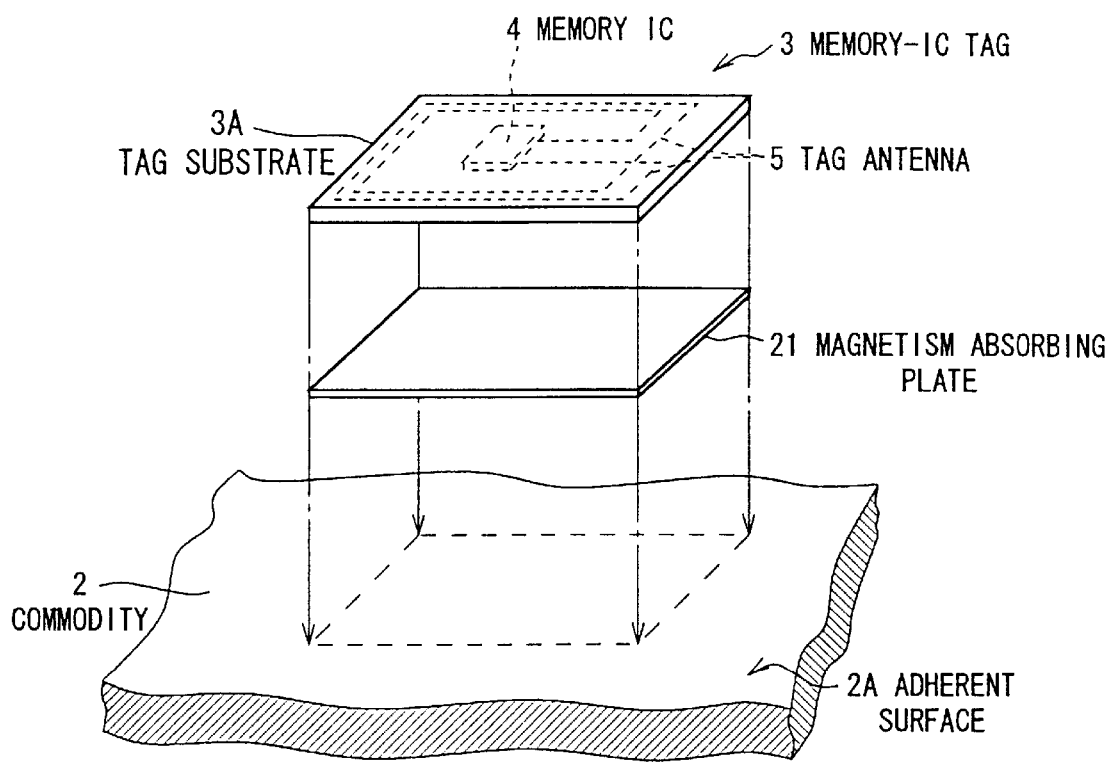
FIG. 7 is a schematic perspective view illustrating one example of an application of the magnetism absorbing plate according to another embodiment.

In addition, as shown in FIG. 7, the magnetism absorbing plate 21 can be provided apart from the memory-IC tag 3. The magnetism absorbing plate 21 can be placed between the adherent surface 2A and the memory-IC tag 3 in only the case where the adherent surface 2A of the commodity 2 is made of metal. The size of the magnetism absorbing plate 21 is almost the same size as that of the loop form of the tag antenna 5 or the slightly larger size than that.

In this case, when the adherent surface 2A of the commodity 2 is made from some other resin than metal, it is not necessary to use the magnetism absorbing plate 21, which frees the magnetism absorbing plate 21 from being wasted. Besides, in the same way as in the case of FIG. 6, it is possible to make the most of the conventional memory-IC tag 3 without waste.

In addition, in the above embodiment, the description has been given of the case where the memory-IC tag 3 is used as an information storing device for being stuck to the adherent surface 2A of the commodity 2. However, the present invention is not limited thereto. The point is that the present invention can be broadly applied to various information storing devices that include a memory IC (storing means) 4 in which the identification data (information) $D_{ID}$ is stored, and a tag antenna (antenna) 5 having the stated loop form and being connected to the memory IC 4 electrically.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A memory IC tag which is stuck to the adherent surface of an object, having an information storing means storing therein prescribed information on said object and an antenna in a loop form connected to said information storing means, and reads out and writes said prescribed information in said information storing means via said antenna in response to a modulated magnetic-field generated from the exterior, said memory IC tag comprising;

a substrate having said information storing means and said antenna;

means for absorbing the modulated magnetic field generated from the exterior after said modulated magnetic field passes through the antenna so that said memory IC tag can read said prescribed information irrespective of the type of the material of the adherent surface of the object, said absorbing means including a magnetism absorbing member made from a high permeable material, provided between said substrate and the adherent surface of said object, and having an area at least sized to cover said antenna provided on said substrate;

an adhesive member adhering said magnetism absorbing member to the substrate; and a gluing member adhering said magnetism absorbing member on the adherent surface of said object.

2. The memory-IC tag according to claim 1, wherein said substrate and said magnetism absorbing member are integrated by said adhesive member, and said gluing member is provided on said magnetism absorbing member integrated with said substrate.

3. The memory IC tag according to claim 1, wherein said adhesive member is provided on said substrate, said gluing material is provided in said magnetism absorbing member, said substrate provided with said adhesive member and said magnetism absorbing member provided with said gluing member are composed as individual units, and said substrate provided with said adhesive member and said magnetism absorbing member provided with said gluing member are integrated when being glued on the adherent surface of said object.

4. The memory-IC tag according to claim 1, wherein said magnetism absorbing member is made from high-permeable materials whose permeability is 10 or more.

* * * * *